(12) United States Patent
Colombo et al.

(10) Patent No.: US 7,025,388 B2
(45) Date of Patent: Apr. 11, 2006

(54) METHOD AND APPARATUS FOR FORMING LEAK-PROOF COUPLING FOR BEVERAGE DISTRIBUTION SYSTEM

(76) Inventors: Henry Colombo, 2341 Clairwood St., St. Clair Shores, MI (US) 48080; Bernard Michael Licata, 27300 Lane, St. Clair Shores, MI (US) 48081

( * ) Notice: Subject to any disclaimer, the term of this patent is extended or adjusted under 35 U.S.C. 154(b) by 402 days.

(21) Appl. No.: 10/039,805

(22) Filed: Oct. 19, 2001

(65) Prior Publication Data

US 2006/0042090 A1  Mar. 2, 2006

Related U.S. Application Data

(60) Provisional application No. 60/241,706, filed on Oct. 19, 2000.

(51) Int. Cl.
*F16L 21/00* (2006.01)

(52) U.S. Cl. ......................... 285/236; 285/915
(58) Field of Classification Search ............... 285/369, 285/132.1, 21.2, 187, 45, 236, 915
See application file for complete search history.

(56) References Cited

U.S. PATENT DOCUMENTS

| | | | | |
|---|---|---|---|---|
| 3,343,252 A | * | 9/1967 | Ressor | 285/915 |
| 3,937,641 A | * | 2/1976 | Kushner et al. | 285/915 |
| 4,669,237 A | * | 6/1987 | Constantine | 52/101 |
| 4,830,060 A | * | 5/1989 | Botsolas | 285/132.1 |
| 4,951,442 A | * | 8/1990 | Harbeke, Jr. | 285/187 |
| 5,078,430 A | * | 1/1992 | St. Onge | 285/15 |
| 5,286,952 A | * | 2/1994 | McMills et al. | 285/21.2 |
| 5,316,352 A | * | 5/1994 | Smith | 285/370 |
| 5,458,380 A | * | 10/1995 | Kanao | 285/369 |
| 5,527,070 A | * | 6/1996 | Blackwell | 285/45 |
| 5,948,509 A | * | 9/1999 | Felson | 285/235 |
| 5,961,154 A | * | 10/1999 | Williams et al. | 285/22 |
| 6,059,319 A | * | 5/2000 | Wyke | 285/21.2 |
| 6,145,895 A | * | 11/2000 | Patel et al. | 285/369 |
| 6,568,430 B1 | * | 5/2003 | Shafer | 285/901 |

FOREIGN PATENT DOCUMENTS

EP    0095915 A1 *  7/1983

* cited by examiner

*Primary Examiner*—Aaron Dunwoody
(74) *Attorney, Agent, or Firm*—Young & Basile, P.C.

(57) ABSTRACT

A method and apparatus is provided for forming a leak proof coupling between two thin walled metallic ends in a beverage distribution system. The pipe ends are prepared by cutting the ends and ensuring that the cross-section of the ends are round. An alignment device in the form of a dual pipe holder holds the prepared pipes in an end to end orientation so that the ends are abutted and parallel to each other. A sealing tape having particular properties with a high performance adhesive is secured around the two ends so that the tape overlaps. A steel coupling is positioned and clamped over the sealing tape. The sealing tape and steel coupling renders the sealed joint leak proof and provides structural integrity.

8 Claims, 5 Drawing Sheets

METHOD AND APPARATUS FOR FORMING LEAK-PROOF COUPLING FOR BEVERAGE DISTRIBUTION SYSTEM

This application claims the benefit of provisional application No. 60/241,706 filed Oct. 19, 2000.

FIELD OF THE INVENTION

The invention relates to a method and apparatus for forming a leak-proof coupling and in particular, a leak-proof coupling for a beverage distribution system.

BACKGROUND OF THE INVENTION

In various establishments where food and beverages are served, it is increasingly common to have the beverage dispensing station positioned in an area that is remote from the beverage storage area. As a result, a beverage distribution system is required, including a conduit system or trunkline that transports the various beverages located at the remote storage area to the beverage dispensing station. As the distance between the beverage storage area and the beverage dispensing area increases, the likelihood of leakage of any of the beverages or condensation from the conduits also increases. A beverage trunkline includes a plurality of beverage and/or refrigerant and/or electrical conduits bundled in a jacket that may include a foam insulation. The trunkline extends overhead from the beverage storage area to the dispensing station. Although the trunkline can be very stiff, the beverage trunkline allows the bundle of conduits to travel in straight or curved lines to reach the beverage dispensing station.

One means to diminish any leakage in the distribution system is to provide a piping system over one or more trunklines which is made of a material that resists degradation and punctures and is light weight for easy suspension overhead. A thin walled metallic piping usually made from aluminum or galvanized steel provides a strong barrier for the bundle of conduits or trunkline and protects the trunkline from damage or degradation. However, since the thin walled metallic material used for the piping system is not as pliable as the trunkline, a plurality of the thin walled metallic piping in abutted configuration is required between the beverage storage station and the beverage dispensing station. The connection point between any two thin walled metallic pipes is a potential access for any leakage. Leakage from an overhead beverage distribution system can cause unsanitary and dangerous conditions for the establishment. Therefore, it is imperative to provide a leak-proof coupling which has structural integrity between any two connecting metallic pipes.

SUMMARY OF THE INVENTION

It is the intent of the invention to address the aforementioned concern for an overhead beverage distribution system. In one aspect of the invention, a method is provided for forming a sealed joint between two thin walled metallic pipe ends, typically aluminum or galvanized steel, of an overhead pipe system for enclosing the plurality of fluid conduits/trunkline. The method includes holding the thin walled metallic pipe so that the pipe ends can be cut for properly squaring each pipe end. If the pipe is made of aluminum, the pipe is held in a vice apparatus so that the pipe can be held tightly without crushing the aluminum material. The squared pipe ends are then rounded with a mandrel for providing uniform ends. A steel coupling is installed to one end of one of the pipes. The two pipe ends are aligned within an alignment device in an abutted end to end orientation. A sealer tape is applied to the abutted ends of the two pipes and the steel coupling is then clamped over the sealer tape which renders the sealed joint leak proof and provides structural integrity.

In another aspect of the invention the sealed joint between the two thin walled metallic pipe ends includes a sealer tape that uses a high performance adhesive having an excellent long term holding power and specific features that make it ideal for bonding to the metallic pipes. The sealed joint further includes a steel coupling for clamping over the sealer tape.

In another aspect of the invention an alignment device is provided for accurately aligning the ends of two pipes. The alignment device has a pair of cylindrical clamps communicating with each other via a handle. Each end of the handle is connected to one of the cylinder clamps for maintaining the clamp in a fixed, spaced and parallel relationship with the other clamp.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4b is an exploded view of the vice apparatus shown in FIG. 4a;

FIG. 7b is an exploded view of the alignment device shown in FIG. 7a;

DESCRIPTION OF THE PREFERRED EMBODIMENT

Figure 1:
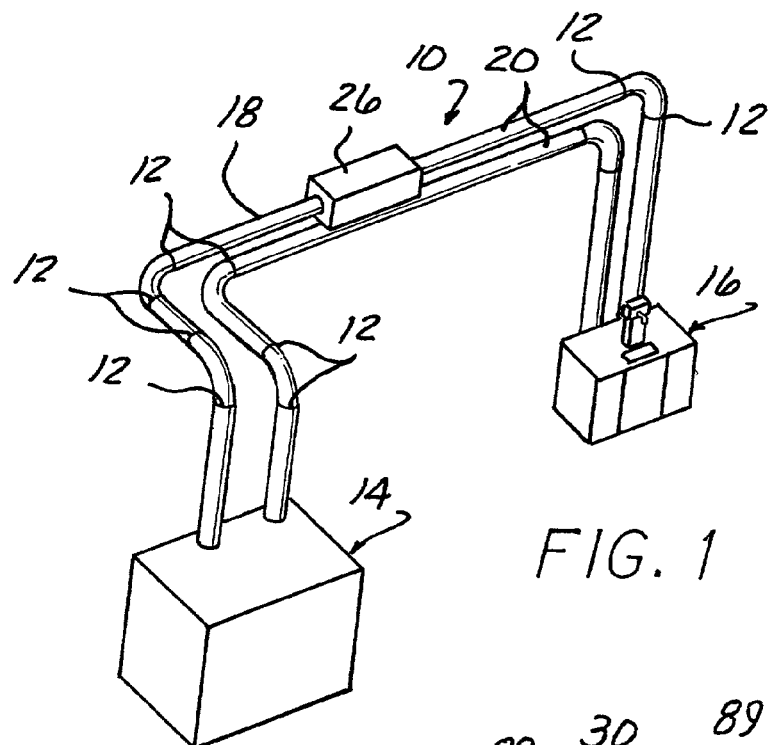
FIG. 1 shows an overhead beverage distribution system incorporating the present invention.
Figure 2:
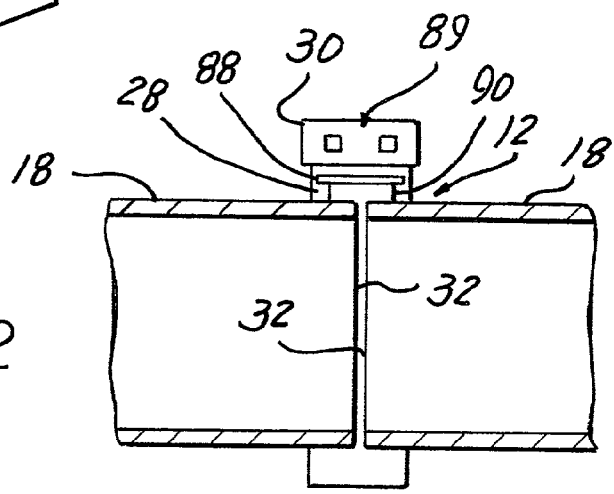
FIG. 2 is a sectional view of the sealed joint.
Figure 3:
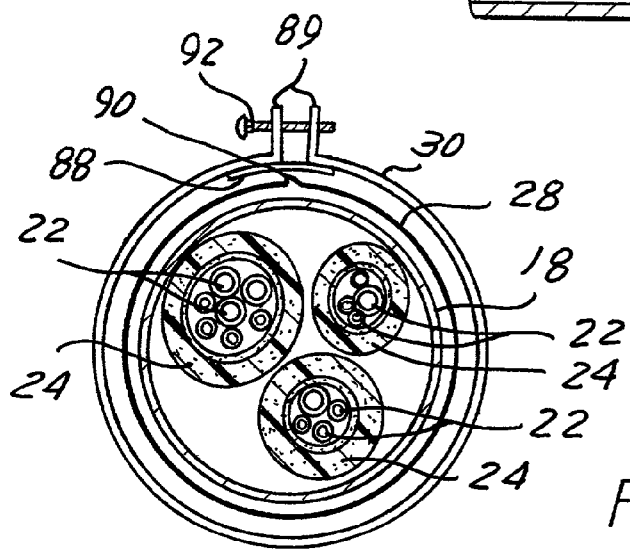
FIG. 3 is a cross-sectional view of a pipe having the sealed joint thereon.

Referring now to FIG. 1, an example of an overhead beverage distribution system 10 is shown using the sealed joints 12 of the present invention. The sealed joint of the present invention is particularly applicable when the beverage storage area 14 is remote from the beverage dispensing area 16, and the series of pipes 18 communicating between the stored beverages 14 and the dispensing unit 16 are run overhead in or adjacent a ceiling (not shown) of an eating and/or drinking establishment. The series of pipes 18 define a chase or channel 20 for housing the multiple conduits in one or more trunklines from the remote beverage storage area to the beverage dispensing area 16.

The piping system houses one or more bundles of conduits 22 used to route and enclose beer, soda, liquor, $CO^2$, and/or refrigerant fluid. The bundles or trunklines may be enclosed in a thick foam insulated tubular member 24 to provide protection and cushion to the conduits 22 therein. One or more of these trunklines may be encapsulated or housed within the chase 20.

The exterior pipe 18 is metallic and preferably made of a thin aluminum alloy with a 14–16 gauge nominal or galvanized steel that can be formed in various configurations. The exterior pipe 18 can consist of a straight section of tubing, available in 10 or 20 foot lengths and diameters of 4", 6" and 8" standard; although other sizes are available. The straight section of the pipe is used as a straight part of the chase network of the beverage distribution system 10 to route and enclose beer, soda, liquor, $CO^2$ and/or refrigerant dispensing lines, and/or electrical wiring for the beverage and food service industries.

The pipe system can also include 90° bend sections of the thin walled aluminum pipe 18. The 90° bend section of metallic pipe 18 also preferably has a tube diameter of 4", 6", or 8" with a 90° bend in 24", 30", or 36" radii as standard sizes, although other sizes are available. Other sections of the pipe 18 may include 45°, 30°, or 22.5° partial bend sections of the metallic pipe 18. The partial bend sections of the metallic pipe 18 preferably have tube diameters of 4", 6", and 8" in 45°, 30°, and 22.5° bends in 24", 30" and 36" radii as standard sizes, although other sizes are available. The partial bend sections of the metallic pipe 18 are used to change direction by 45°, 30°, or 22.5° or to upset the direction as part of the chase network. Custom partial bends are available in any degree bend from 5° to 85°.

The beverage distribution system 10 may further include a splice/pull box 26 or a junction box to provide an opening or pull location as part of the chase network, or to provide an opening or location where a splice or redirection is required as part of the chase network. The splice/pull 26 box is recommended to be installed at approximately 100 foot intervals of the straight tubing or approximately four 90° bends of their equivalent. The junction box is used as the junction, splice, or redirection location part of the chase network to route and enclose the beverage distribution conduits. The junction box is installed as required in the beverage distribution system 10.

Between each section of the metallic pipes is a sealed joint 12 installed according to the present invention. The sealed joint 12 includes a sealing tape 28 and a steel clamp 30. The combination of the sealing tape 28 having particular attributes and the steel clamp 30 renders the sealed joint 12 leak proof and provides structural integrity to the sealed joint 12.

Figure 4A:
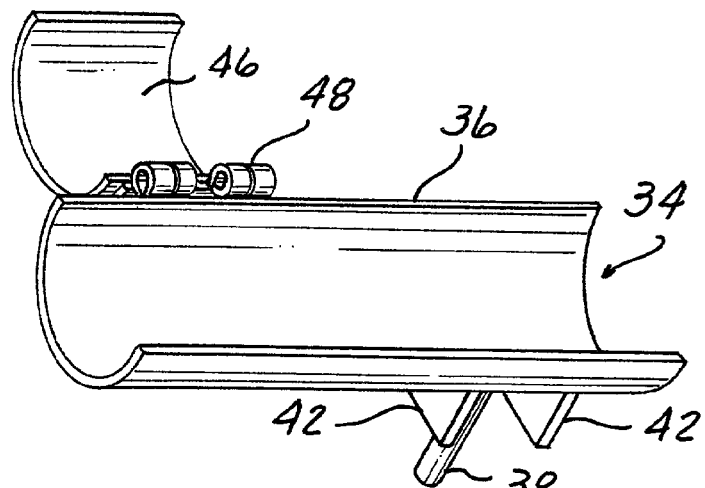
FIG. 4a is a perspective view of a vice apparatus used for holding and squaring each pipe end to form the sealed joint.
Figure 4B:
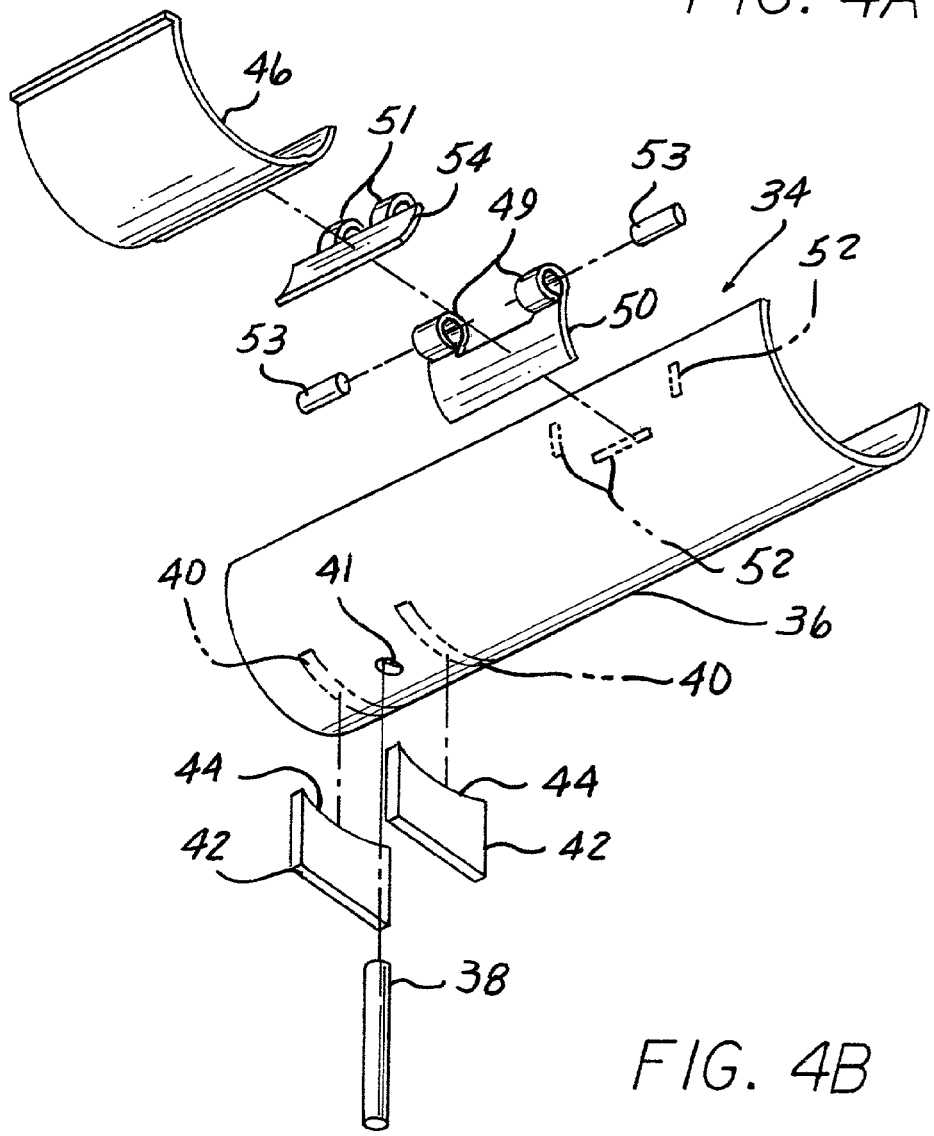

The process to install a leak proof sealed joint 12 between sections of pipes 18 requires proper preparation of the ends 32 of the pipes18 to be joined. Each pipe end 32 must be properly squared. A vice apparatus 34 is preferably used during the cutting and shaping process of the pipe ends 32 if the material of the pipe 18 is aluminum. The vice apparatus 34 cradles and protects the pipe 18 while holding the aluminum pipe 18 securely without crushing the thin member during the cutting an/or shaping process. An example of a vice apparatus 34 is shown in FIG. 4a. This vice apparatus 34 includes a first semi-cylindrical portion 36 for receiving or cradling the pipe 18 to be cut. The first semi-cylindrical member 36 is attachable to a standard plumbers' tripod or other work structure (not shown) by means of a post 38 through aperture 41. The stabilizing dowels 42 are provided to rest on the work structure and have one side with a curvature 44 for resting against the first semi-cylindrical member 36 at positions 40. The post 38 is connected proximate to one end of the first semi-cylindrical member 36 so that the vice apparatus 34 is cantilevered. A second shorter semi-cylindrical member 46 is hingedly connected to the first semi-cylindrical member 36 at the other end of the first semi-cylindrical member 36. A first flange member 50 is welded to the first semi-cylindrical member 36 at weld points 52. The first flange member 50 includes a first set of apertures 49. A second flange member 54 is welded to the second semi-cylindrical member 46 at similar weld points (not shown). The second flange member 54 includes a second set of apertures 51 that are aligned with the first set of apertures 49. Pins 53 are securely received in the first and second set of apertures 49, 51 to provide the pivot point 48. The second semi-cylindrical member 46 therefore can pivot around pivot point 48 so that it forms a cylindrical portion together with the first semi-cylindrical member 36 when in the closed position. When the second semi-cylindrical member 46 is in the closed position, the aluminum pipe 18 located inside the vice apparatus 34 is held securely in place during the cutting process without bending the pipe 18. The vice apparatus 34 is not necessary for cutting pipes 18 made of a hard metal such as galvanized steel, which won't distort during the cutting process.

Figure 5:
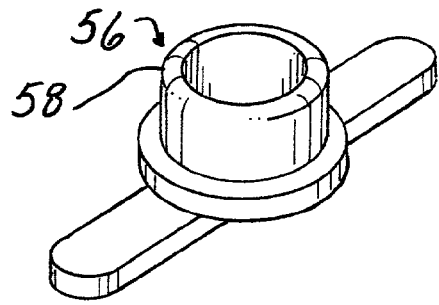
FIG. 5 is a perspective view of a mandrel for rounding each pipe end to form the sealed joint.

After the ends 32 of the pipes 18 are squarely cut each cut end 32 must be shaped to assure that each end 32 is properly rounded. A mandrel 56 similar to that shown in FIG. 5 can be used. The round formation 58 on the mandrel 56 is temporarily placed into the ends 32 of the pipe 18 to ensure uniform rounded ends 32 for forming the sealing joint 12. If the pipe is made of aluminum, the pipe 18 remains in the vice apparatus 34 during the rounding or shaping process so that the pipe is not bent, crushed or otherwise damaged. The mandrel 56 and the vice apparatus 34 may be removed after the shaping process. To further prepare the ends 32 of the pipes 18, the ends 32 of each pipe 18 must be assured that there are no sharp edges by preferably filing an inside chamfer. In addition, each pipe end 32 must be cleaned to remove any debris or dirt.

Figure 6:
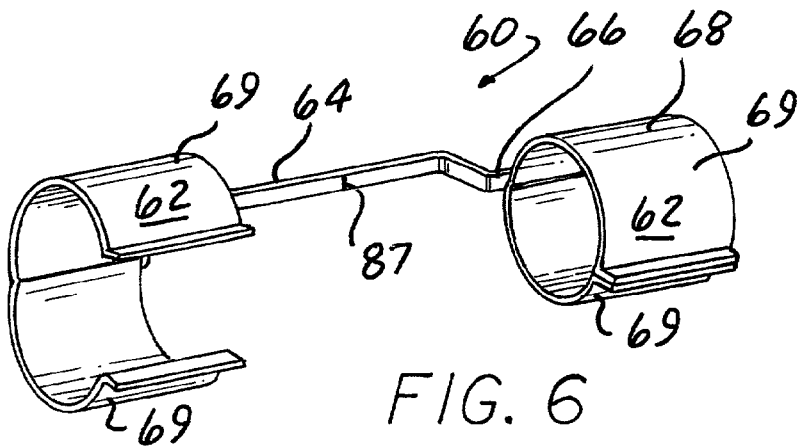
FIG. 6 is a perspective view of one embodiment of an alignment device for accurately aligning a pair of pipe ends in an abutted end to end orientation.
Figure 7A:
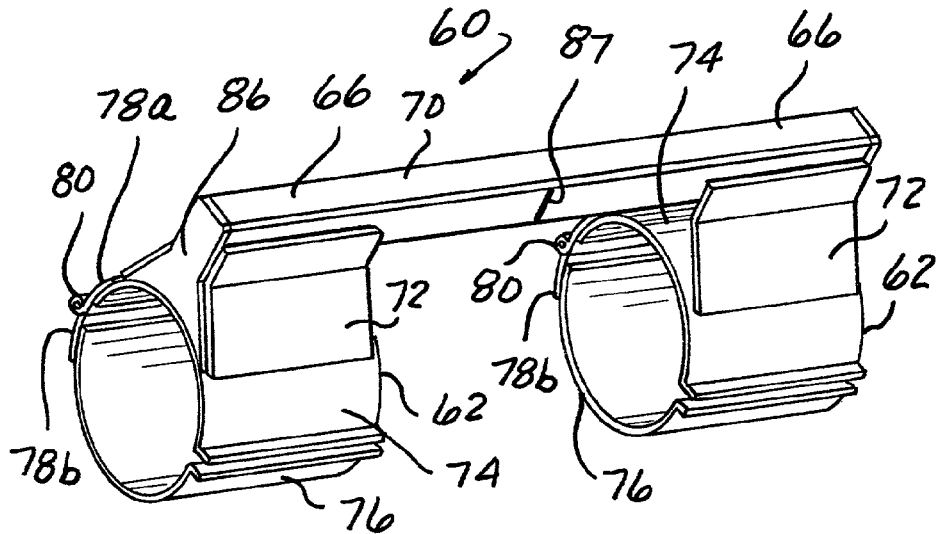
FIG. 7a is an alternative and preferred embodiment of the alignment device used in the present invention.
Figure 7C:
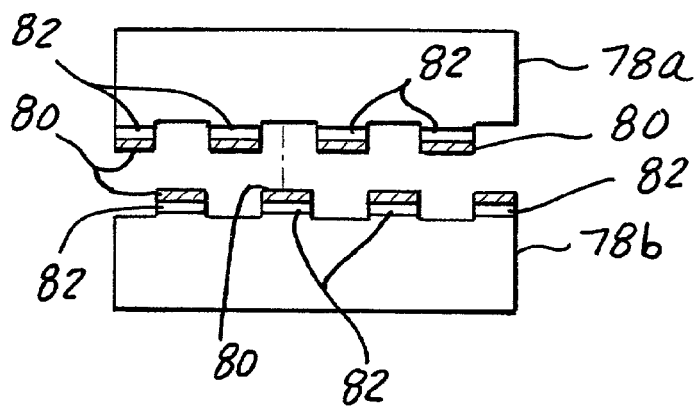
FIG. 7c is a sectional view of a connecting portion of the alignment device.
Figure 7B:
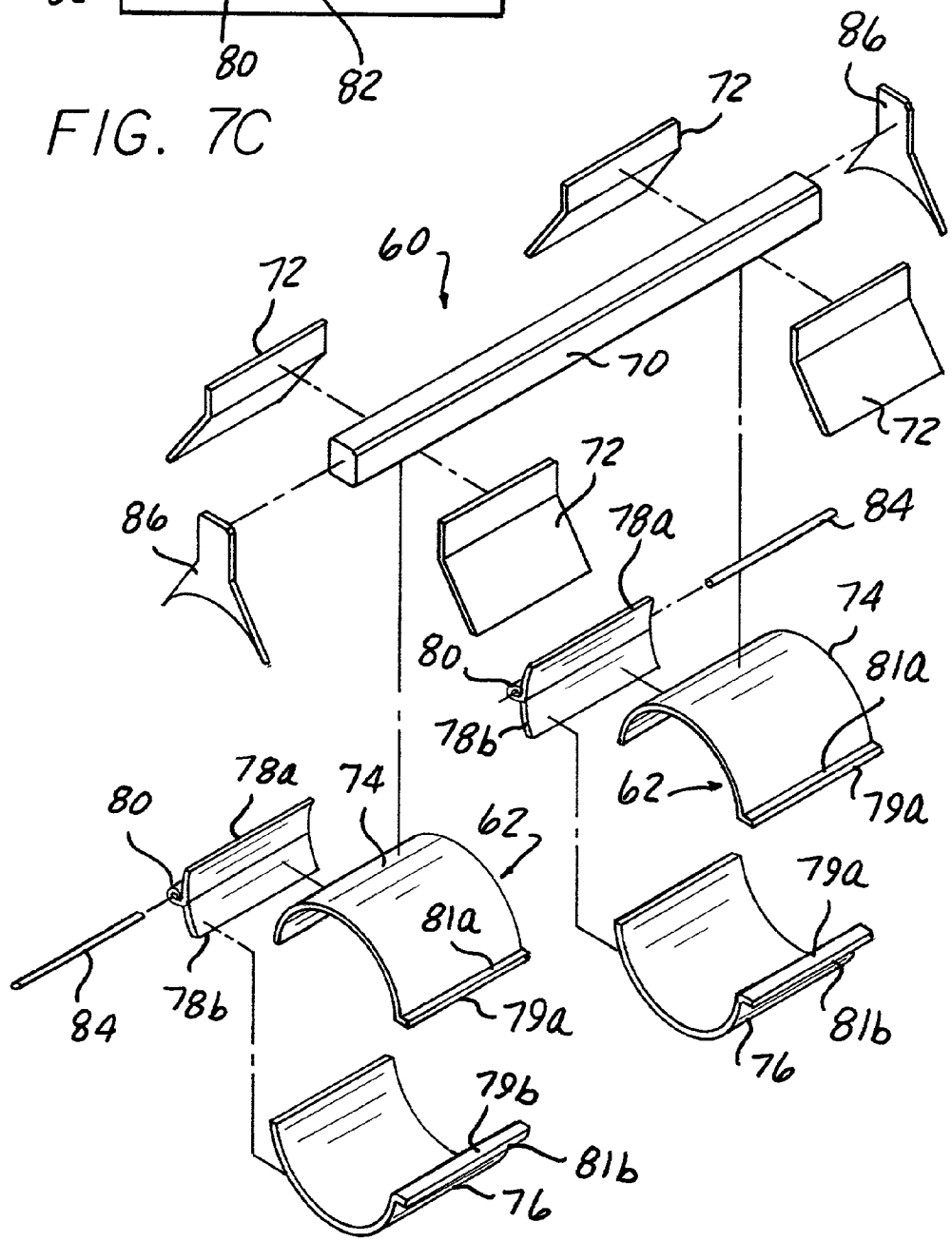

After the two ends 32 of the pipe 18 are cut, rounded and cleaned, the two ends 32 of the pipes 18 are now aligned to each other with an alignment device. The alignment device of the present invention includes a dual pipe holder 60 so that the ends 32 can be abutted in an end to end orientation. A dual pipe holder 60 is shown in FIG. 6 with an alternative variation shown in FIGS. 7a and 7b. The dual pipe holder 60 includes a pair of holding clamps 62 spaced from each other by a handle 64. The handle 64 may be oriented as a straight bar as shown in FIGS. 7a, 7b wherein its ends 66 are rigidly attached to an exterior surface 68 of each pipe holder clamp 62. The handle 64 may have another orientation such as a U-shaped formation as shown FIG. 6. However, it is important that the pair of pipe holder clamps 62 are oriented by the handle 64 so that the pipes 18 are parallel to each other when disposed in the clamps 62. In the embodiment shown in FIG. 6, each pipe holder clamp 62 includes a pair of semi-cylindrical portions 69 that are pivotally connected to each other. When the pipe holder clamp 62 is pivoted in an open position, a pipe 18 is allowed to be loaded within the clamp 62. When the pipe holder clamp 62 is in a closed position, the pipe 18 is securely held in place within the clamp 62.

The embodiment of the dual pipe holder 60 shown in FIGS. 7a and 7b includes a one inch square tube bar stock 70 having a wall thickness of approximately 0.125 inches. A pair of angled flanges 72 are welded at each end of the stock bar 70. Each pair of angled flanges 72 are welded onto opposing surfaces of the bar 70. Holder clamps 62 are also attached to the stock bar 70. Each holder clamp 62 of the embodiment shown in FIGS. 7a and 7b include a first half cylindrical portion 74 which is welded to the stock bar 70. Each holder clamp 62 also includes a second half cylindrical portion 76. An arcuate member 78a and 78b is welded to each respective half cylindrical portions 74 and 76. The arcuate members 78a and 78b as shown in FIG. 7c provide the connecting and pivoting portions for the half cylindrical portions 74 and 76. Each arcuate member 78a and 78b has spaced longitudinal grommets 80. The grommets 80 are orientated so that the grommets 80 intermesh and the apertures 82 are in alignment for receiving securing pins 84. Pins 84 pivotally connect the first half cylindrical portion 74 to second half cylindrical portion 76 to open and close the holder clamp 62. A plate 86 connects edges of the angled flanges 72 and the first half cylindrical portion 74 at each end of the stock bar 70 to provide added stability to the dual pipe holder 60. The plates 86 are shaped to conform to the peripheral edges of the stock bar 70, the angled flanges 72 and the first half cylindrical portion 74. Locking tabs 79a and 79b are provided to secure the free ends 81a and 81b of the first and second half cylindrical portions 74 and 76 respectively together when the holder clamp 62 is in the closed position. Other means for securing the free ends 81a and 81b together may include commercially available latches, magnets, etc.

Figure 8A:
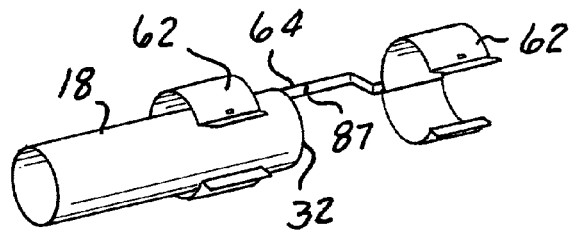
FIGS. 8a–8g illustrate the steps of aligning ends of the two pipes and forming the sealed joint.
Figure 8B:
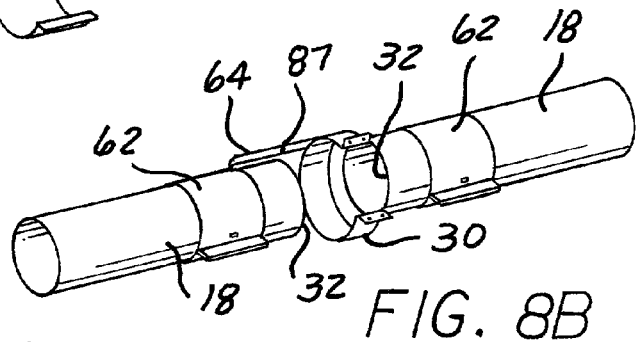
Figure 8C:
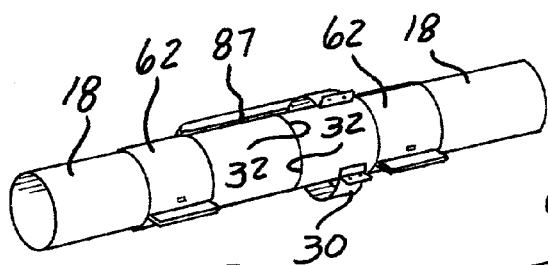

FIGS. 8a through 8g shows the steps for using the dual pipe holder 60 for forming the sealed joint. The first pipe holder clamp 62 is placed over the first pipe so that the end 32 that is to be joined, is aligned to a mark 86 on the handle 64 (FIG. 8a). The first pipe holder clamp 62 is then closed over the pipe 18 to securely hold the pipe 18 in place. The steel coupling 30 is then placed around the pipe 18. The second pipe 18 is loaded into the second pipe holder clamp 62 so that the end 32 of the pipe is positioned at the mark 86 of the handle 64 (FIG. 8b). The second pipe holder clamp 62 is then closed around the second pipe 18 to securely hold the pipe 18 in place. At this point, the ends 32 of the pipes 18 are abutted as close together as possible (FIG. 8c).

To obtain optimum adhesion from the sealing tape 28, the ends 32 of the pipes 18 in the dual pipe holder 60 must be well unified, cleaned and dried. Preferably cleaning solvent such as, an isopropyl alcohol and water mixture (rubbing alcohol) or hepatane can be used. The ends 32 of the pipes 18 are then wiped dry with a clean rag or paper towel. The surfaces of the ends of the pipes are now in condition and prepared for receiving the adhesive sealing tape 28.

The sealing tape 28 is preferably made from an acrylic, polyolefin, or other similar material, foam closed cell substance having a pressure-sensitive acrylic or similar material adhesive thereon. The peel adhesion rating of the sealing tape 28 for stainless steel at room temperature should be at least 18 lbs/in. The normal tensile strength to aluminum at room temperature should be at least 50 lbs/in$^2$ and preferably 80–110 lbs/in$^2$. The static sheer measured by ASTM D-3654 should hold at least 1000 grams and preferably 1250 grams at 72° Fahrenheit for 10,000 minutes. The static sheer should hold at least 500 grams at elevated temperatures up to 150° F. The dynamic sheer should hold at least 40 lb/in$^2$, and preferably at least 60 lb/in$^2$ at room temperature with a one inch square overlap. Temperature tolerance of the adhesive tape should be at least 200° in the short term and 160° in the long term where the tape can support 250 grams in static sheer for 10,000 minutes. Available tapes having these features are VHB™ double coated acrylic tapes and adhesive transfer tapes products number 4941, 4941F, and 4951 offered by the 3M Company located in Minnesota. VHB™ foam tape 4951 is particularly advantageous since the minimum suggested application temperature can be as low as 32° Fahrenheit. Although the aforementioned sealing tapes 28 are preferred, further testing of other manufacturer's tapes may provide similar properties.

Figure 8D:
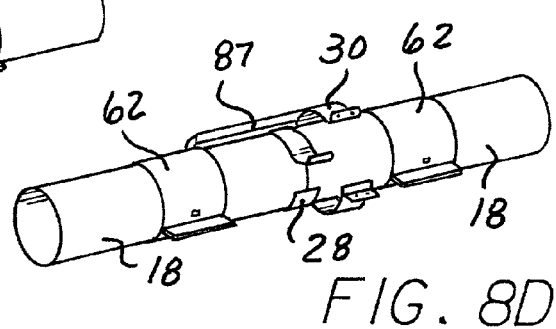

To apply the sealing tape 28, approximately 1" of one side of the backing is peeled away from the pre-cut tape 28 and aligned to the butted ends 32 of the pipes 18 located in the dual pipe holder 60 (FIG. 8d). The backing is continued to be peeled back as the tape is smoothed around the joint. The sealing tape 28 must lay flat and smooth and must overlap approximately 3/16" to 1/4". The remainder of the backing is removed from the outside of the tape.

Figure 8E:
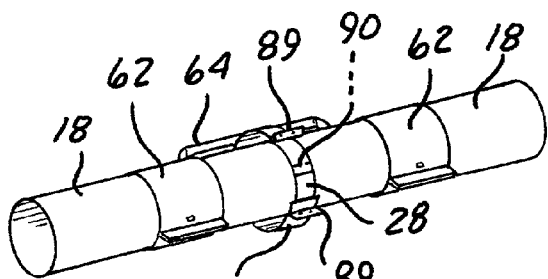
Figure 8F:
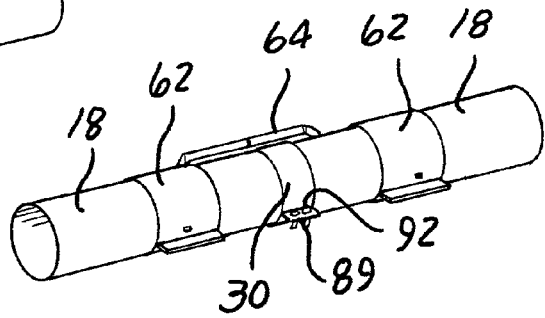
Figure 8G:
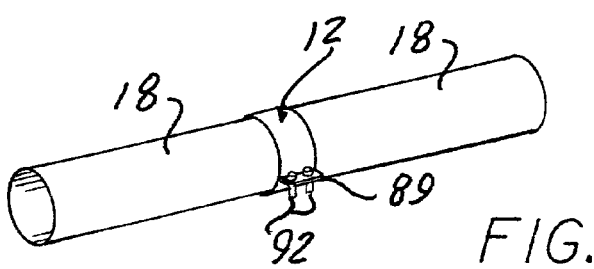

The steel coupling 30 is next slid over the sealing tape 28 so that the tongue 88 of the coupling 30 is squarely on the overlap 90 of the tape 28. The tongue 88 is a narrow strip of metal connected to the interior and near one end of the coupling 30. The tongue 88 extends past the end 89 of the coupling 30. The steel coupling 30 is revolved around the pipe 18 so that it is evenly contacting the tape 28 (FIG. 8e). The clamped ends 89 of the steel coupling 30 are held together by lock washers, nuts and bolts 92 which are tightened to the maximum to securely hold the steel coupling 30 in place (FIG. 8f). Once the steel coupling 30 is secured to the pipes 18, the dual pipe holder 60 can be removed from the pipes 18, and the next joint can be sealed (FIG. 8g).

After application of the sealing tape 28, the bond strength of the adhesive will increase as the adhesive flows onto the surface of the pipe ends 32. At room temperature, approximately 50% of the ultimate strength of the adhesive will be achieved after 20 minutes, 90% of the ultimate strength will be achieved after 24 hours and 100% of the ultimate strength will be achieved after 72 hours. In some instances, the ultimate bond strength of the adhesive can be achieved more quickly by exposure of the bond to elevated temperatures (i.e. 150° Fahrenheit for one hour). Therefore, it is recommended that one allows 24–48 hours after the last joint assembly is completed before threading the beverage conduits/trunkline through the aluminum or galvanized steel chase system. The structural integrity of the resultant sealed joints of the present invention provides a significant value for the installation of the beverage trunklines through the chase network. The stiff nature of the beverage trunkline requires high pulling forces for installing the trunklines through the beverage chase network. Therefore, the structural integrity of the resultant sealed joints provides assurance that the joints will not separate during installation of the trunklines.

Although the sealed joint of the present invention is disclosed in the environment of a beverage distribution system, it is known that the sealed joint of the present invention may be used in other environments where having a leak-proof joint between two thin walled metallic pipes is imperative.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A sealed joint for an overhead pipe system for a fluid distribution system, the sealed joint comprising:
    a pair of adjacent thin wall metallic pipes having smooth interior and exterior surfaces and end portions, each end portion having a squared cut terminal end and a rounded cross-sectional configuration, wherein a pair of the pipe squared cut terminal ends of the adjacent pipes are positioned in a parallel and an end to end relationship to each other, and wherein the pair of the pipe squared cut terminal ends essentially abut each other;
    a strip of a double-sided adhesive, closed-cell acrylic foam tape wherein a portion of the strip is applied around and over the exterior surfaces of each of the abutting pipe squared cut terminal ends, and wherein the strip of double-sided adhesive, closed-cell acrylic foam tape has a first end and a second end and said second end forms an overlap over the first end and contacts the first end; and
    a coupling clamped over the double-sided adhesive, closed-cell acrylic foam tape.

2. The sealed joint of claim 1, wherein the coupling has clampable ends and wherein the clampable ends are positioned and secured together over the overlap of the double-sided adhesive, closed-cell acrylic foam tape.

3. The sealed joint of claim 1, wherein the pair of abutting pipe squared cut terminal ends are butted as close together as possible and a portion of the strip of double-side adhesive, closed-cell acrylic foam tape is secured to the exterior surfaces of each of the adjacent pipes for providing a sealed joint.

4. A sealed joint for an overhead pipe system for a beverage distribution system, the sealed joint comprising:
    a pair of thin wall metallic pipes having axial lengths with smooth interior and exterior surfaces along the entire axial lengths, each pipe having extremities, wherein each pipe is positioned in a parallel and an end-to-end relationship to each other forming abutting extremities;
    a double-sided adhesive, closed-cell acrylic foam tape having a normal tensile strength of at least 80–110 lbs./in² to aluminum at room temperature, wherein a portion of said double-sided adhesive, closed-cell acrylic foam tape is wrapped around the exterior surfaces of each of the abutting extremities for providing a leakproof joint and a smooth interior surface at the joint;
    and a coupling having clampable ends, clamped and secured together over the double-sided adhesive, closed-cell acrylic foam tape.

5. The seal joint of claim 4 wherein the double-sided adhesive, closed-cell acrylic foam tape is precut so that a second end of the precut tape overlaps over and contacts a first end of the precut tape around said pipe extremities forming an overlap approximately 3/16"–1/4" long and at least one of the clampable ends has a tongue extending therefrom, wherein the tongue is positioned directly over the overlap.

6. The sealing joint of claim 4, wherein the double-sided adhesive, closed-cell acrylic foam tape further provides a static sheer of at least 1000 grams at 72° and 500 grams at 150° F., has a peel adhesion rating for stainless steel at room temperature of at least 18 lbs./in.

7. The sealing joint of claim 6, wherein the double-sided adhesive, closed cell acrylic foam tape is appliable on the pair of pipe extremities at a temperature as low as 32° F.

8. A sealed joint for an overhead pipe system for a beverage distribution system, the sealed joint comprising:
    a pair of metallic pipes having smooth interior and exterior surfaces, the pair of metallic pipes each have a terminal end abutted in an end-to-end relationship to each other;
    a double-sided adhesive, closed-cell acrylic foam tape applied around the exterior surfaces of each of the abutted terminal ends, wherein the adhesive foam tape has an axial length and the axial length of the tape is positioned essentially parallel to the abutted terminal ends, and wherein the adhesive foam tape has one end overlapping and secured to an opposing end of the tape forming an overlap; and
    a coupling clamped over the acrylic foam tape, wherein said coupling has a pair of clampable ends secured together and tightened over the overlap of the tape and wherein the double-sided adhesive, closed-cell acrylic foam tape has the following properties: a peel adhesion rating of at least 18 lbs/in² at room temperature for stainless steel, a normal tensile strength to aluminum at room temperature of at least 50 lbs./in², a static sheer of at least 1000 grams at 72° F. and of at least 500 grams at 150° F., a dynamic sheer of 40 lbs./in², a static sheer of 250 grams for 10,000 minutes and a temperature tolerance of at least 160° F.

* * * * *